May 29, 1962  S. T. CARTER  3,036,689
CONVEYOR SYSTEM FOR SUPPLYING ARTICLES OF A PLURALITY
OF KINDS TO APPARATUS FOR ASSEMBLING THEM
Filed Nov. 2, 1959  5 Sheets-Sheet 1

INVENTOR.
Sidney T. Carter
BY
Roberts Cushman & Grant
ATTYS

May 29, 1962

S. T. CARTER 3,036,689

CONVEYOR SYSTEM FOR SUPPLYING ARTICLES OF A PLURALITY
OF KINDS TO APPARATUS FOR ASSEMBLING THEM.

Filed Nov. 2, 1959

INVENTOR.
Sidney T. Carter
BY
Roberts Cushman & Grover
ATTYS

May 29, 1962

S. T. CARTER 3,036,689

CONVEYOR SYSTEM FOR SUPPLYING ARTICLES OF A PLURALITY
OF KINDS TO APPARATUS FOR ASSEMBLING THEM

Filed Nov. 2, 1959

INVENTOR.
Sidney T. Carter
BY
Robert Cushman Grooms
ATT'YS

United States Patent Office 3,036,689
Patented May 29, 1962

3,036,689
CONVEYOR SYSTEM FOR SUPPLYING ARTICLES OF A PLURALITY OF KINDS TO APPARATUS FOR ASSEMBLING THEM
Sidney T. Carter, Shrewsbury, Mass., assignor to Geo. J. Meyer Manufacturing Co., Cudahy, Wis., a corporation of Wisconsin
Filed Nov. 2, 1959, Ser. No. 850,302
15 Claims. (Cl. 198—19)

This invention pertains to conveyor systems designed to deliver articles of diverse kinds to a processing unit or units at each of which articles of different kinds are assembled or combined, and relates more especially to a system wherein articles may be delivered to several independent processing units in such a way that if one such unit temporarily ceases to function, articles of each respective kind will be delivered in full supply to each unit which continues to function. As a specific example of the utility of such a system, it will herein be described and illustrated (but without limiting intent) as designed to supply empty cartons and filler charges to packing machines, each of which is operative to assemble bottles to form a filler charge and then to deliver the charge into a waiting carton. It may be assumed that the bottles are supplied to the packing machine by appropriate means which may be of conventional type and which receives bottles from a labeling machine or machines and delivers them in orderly array to the packing machine, such an apparatus, for example, being disclosed in the patent to Carter, No. 2,804,961, dated September 3, 1957; that the packing machine may, for instance, be of the type more fully disclosed in the copending application of Sidney T. Carter, Serial No. 815,877, filed May 26, 1959, and that the cartons will be supplied to the apparatus of the present invention in any suitable way, but preferably one after another in a stream, which follows a predetermined path, by means which permits the stream to cease flowing if the foremost carton in the stream be stopped.

A principal object of the invention is to provide automatically operating apparatus for supplying articles to each of a plurality of processing units in such a way as to minimize delay and insure maximum production of the several units. A further object is to provide a system of the above type having provision for automatically preventing the admission of articles to the system except when at least one of the several processing units is ready to receive an article. A further object is to provide a conveyor system useful, for example, in supplying empty cartons and bottles to a plurality of packing machines and so devised that if a given packing machine stops or is delayed in its operation, the orderly supply of cartons to the apparatus as a whole will not thereby be affected.

In the attainment of the above objects the present invention provides an automatically operating conveyor system for supplying articles to each of a plurality of processing units in such a way as to minimize delay and to insure maximum production by each respective unit, said system comprising a constantly acting supply conveyor of a width to advance articles in single file, only, a plurality of constantly acting serving conveyors, corresponding in number to the number of processing units to be supplied, each of which is arranged to supply articles to a single one only of said units, respectively, means operative to transfer articles from the supply conveyor to each of the several serving conveyors, and article-detaining means associated with each serving conveyor and which is operative, at times, to hold an article in a dwell position intermediate the supply conveyor and that processing unit which is supplied by the respective serving conveyor, apparatus operative to cause the detaining means to hold an article at the dwell point when the processing unit, which is supplied by that particular serving conveyor, refuses to accept an article at the proper interval of time, while the several conveyors continue to function in normal manner, and automatically acting means operative to deny admission of an article to the receiving end of the supply conveyor except when there is at least one processing unit which is ready to receive an article.

The invention further provides an article-detaining element operative to cause an article, in approaching a servicing conveyor, to dwell at the transfer station, at which articles are shifted from the supply conveyor to the servicing conveyor, until the dwell station is empty. It further provides article-detaining devices operative to determine to which of successive transfer stations, longitudinally of the main or supply conveyor, a given article shall be delivered. It further provides a conveyor to which processed articles are delivered by the several processing units, and apparatus operative to delay the delivery of an article to said last-named conveyor by a processing unit while an article delivered to said conveyor by a preceding processing unit is in position on the conveyor such as to interfere with the delivery of an article by the first-named unit.

Other and further features of the invention and objects thereof will be pointed out in the following more detailed description and by reference to the accompanying drawings wherein, FIG. 1 is a diagrammatic plane view illustrating the principle of the present invention, but without details as to the particular mechanism employed in transferring articles from point to point throughout the system;

Figure 1:
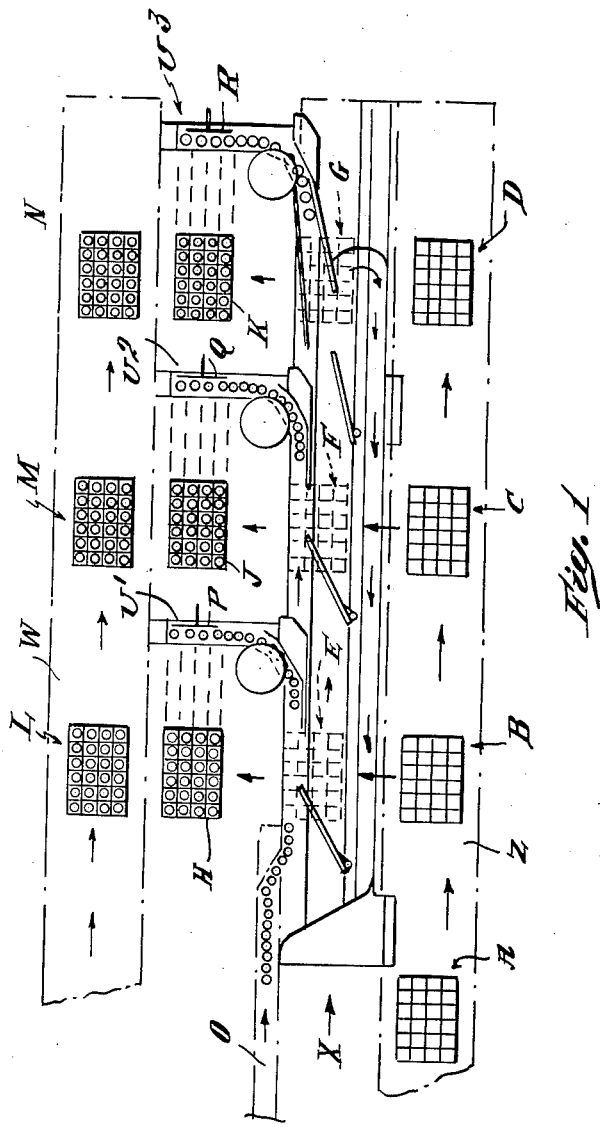

Referring to FIG. 1 of the drawings, which diagrammatically illustrates the principle of the invention, the character Z designates a conveyor for empty cartons or cases; the character W a conveyor for filled cases; the characters $U^1$, $U^2$ and $U^3$ designate three processing units, specifically packing machines for assembling a charge of bottles and discharging the charge into a carton or case; the character O designates a supply conveyor for the bottles to be packed, and the character X designates apparatus designed to divide the bottles delivered by the conveyor O and to discharge them into the intakes for the several packing machines $U^1$, $U^2$ and $U^3$. The device X may, for example, be of the type more fully disclosed in the copending application of Sidney T. Carter, Serial No. 684,480, filed September 17, 1957, now Patent No. 2,820,738 and which, by a proper ratio of speeds of several conveyors, is operative to divide the bottles substantially equally among the several packing machines. However, other means for supplying the bottles to the packing machines according to their several requirements may be employed. It may be understood that the conveyors Z and W are at a lower level than the supply conveyor O and the conveyors comprised in the dividing mechanism X, and that cartons which are moved by the conveyor Z to the positions or stations B, C and D, respectively, hereinafter sometimes referred to as "transfer stations," will be moved from these several positions, in branch paths perpendicular to the motion of the conveyor Z, by any suitable means or mechanism, not illustrated in FIG. 1, and by such means or mechanism moved along below the divider device X and into the lower level of the respective packers in readiness to receive a charge of bottles.

In the operation of apparatus of this type, and assuming, in the first instance, that all of the packers $U^1$, $U^2$ and $U^3$ are in operation, suitable means, at the opint A will release three successive cartons which will be carried by the conveyor Z to the stations B, C and D here referred to as transfer stations. From these stations, as above suggested, cartons may be moved transversely along the branch paths until they arrive at the stations E, F and G, respectively, and then to the stations H, J and K, respectively, from which they are elevated to receive a charge of bottles through a suitable grid and are then lowered and delivered onto the conveyor W. In the event that a given packer unit is not ready to receive a carton when it arrives at one of the stations E, F or G, respectively, then the carton may dwell at such station until the packer unit is in condition to receive it.

Filled and labeled bottles, supplied by the conveyor O, are taken by the apparatus X and delivered in substantially equal quantities to the several packer units $U^1$, $U^2$ and $U^3$ where, by means of pusher devices P, Q and R, respectively, bottles are assembled to form a charge for delivery into the empty cartons or cases, which have arrived at the stations H, J or K. The above will be the normal operation of the apparatus, assuming that all of the packers are in operation. If it be assumed, for example, that the packing unit $U^2$ is stopped temporarily, and that the other packer units $U^1$ and $U^3$ continue to function, cartons which arrive at station points B and D will in normal fashion be transferred to the points E and G, respectively, and then to the stations H and K as soon as filled cartons have left the latter. As soon as the carton leaves the point D, the carton which has been temporarily detained at the point C (because of a previous carton dwelling at station F) will move on to the point D while two new cartons will be released at the first or gateway station A and moved to the positions B and C, respectively. Since the unit $U^2$ is not in operation, the carton which has now arrived at the position C will remain temporarily at this point, while cartons will move from the points B and D to the points E and G, respectively. Thus both of the operating packer units $U^1$ and $U^3$ will continue to receive supplies of empty cartons as fast as they can fill them and deliver them, even though packer unit $U^2$ is not running. As soon as the unit $U^2$ again comes into operation, cartons will be supplied, the first carton being that which has temporarily been detained at the point F. It is by reason of the fact that the intermediate dwell points E, F and G are provided that it would be possible to continue operation, for example, of the unit $U^3$ even though both of the preceding units $U^1$ and $U^2$ were stopped.

FIGS. 2, 3, 3a and 4 illustrate a practical embodiment of the above principle as applied to the supply of cartons and bottles to two packing units.

Figure 2:
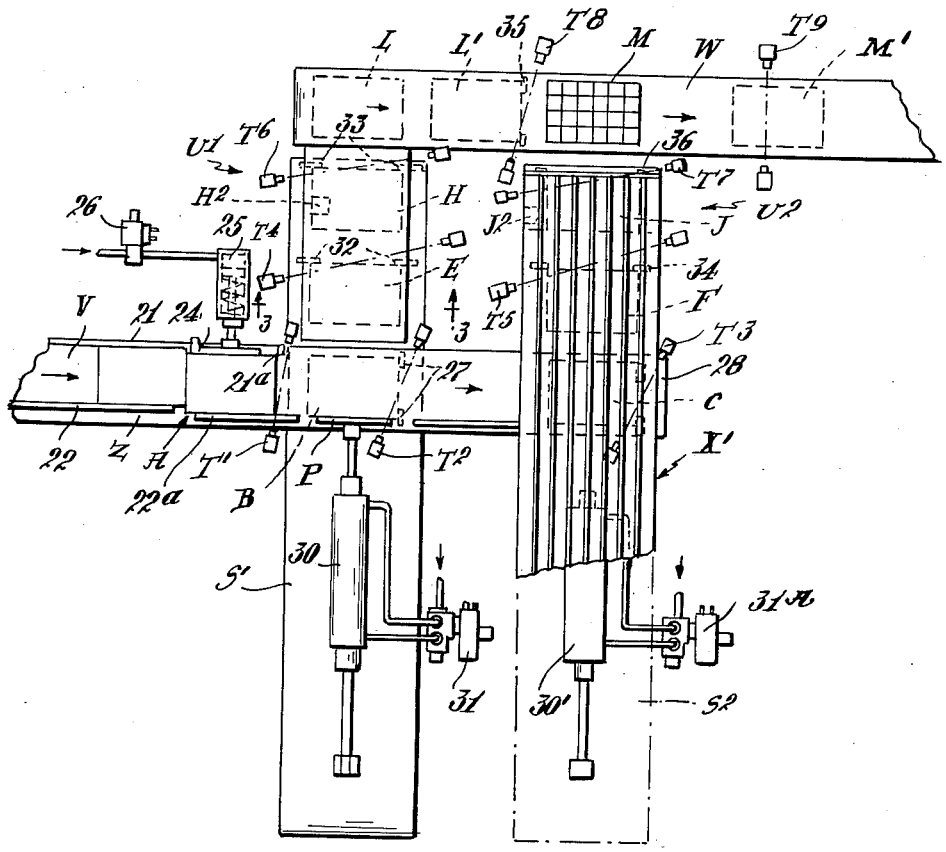
FIG. 2 is a plan view, more or less diagrammatic, showing apparatus according to the present invention as applied to the supply of articles to and the discharge of articles from two packing machines.

Referring particularly to FIG. 2 of the drawings, the characters $U^1$ and $U^2$ designate two packing units corresponding to the similarly designated units as shown in FIG. 1, it being understood that the unit $U^2$ represents the last unit of the series, if there be more than two units comprised in the system. The character Z represents the main conveyor which supplies cartons or packing cases to the packing machines; the character W indicates the delivery conveyor which carries away the filled cases; the characters B, E and H indicate dwell stations of the first packing unit $U^1$, while the characters C, F and J indicate corresponding dwell stations of the packing unit $U^2$. The characters $S^1$ and $S^2$ designate, respectively, base members at the lower level of the device, which support the mechanism whereby cartons are moved from the stations B and C to the stations E and F, respectively, and the characters L and M correspond to the positions of a carton on the delivery conveyor W, as indicated by the same characters in FIG. 1. The character $L^1$ indicates an intermediate position of a carton, between the points L and M, while the character $M^1$ indicates the position of a carton which has been moved away by the delivery conveyor W from the position M. The character $X^1$ represents a portion of the upper level of the packing unit $U^2$, providing a plurality of parallel channels for bottles which are to be accumulated to form a charge for delivery to an empty carton, this part $X^1$ of the apparatus, which represents the charge accumulating mechanism, being, for example, like that more fully disclosed in the application of Sidney T. Carter, Serial No. 815,877, filed May 26, 1959. However, any other suitable charge accumulating means may be employed. It will be understood that bottles will be delivered to this charge accumulating mechanism $X^1$ by any suitable means such, for example, as that diagrammatically illustrated at O and X in FIG. 1.

As shown in FIG. 2, the conveyor Z is provided with fixed guide rails 21 and 22, at its opposite sides, spaced apart a distance to receive between them the empty carton V and thereby to keep the cartons in properly oriented position as they approach the distributing apparatus of the present invention. At the station A the rail 21 is discontinued and is replaced by a pusher device or plunger 24, while at the opposite side of the conveyor Z the rail 22 is offset from the main part of the rail, as shown at 22a. A fixed stop member 21a is provided at the end of the conveyor, being spaced apart from the end of rail member 21 a distance substantially equal to the length of the carton. The pusher member 24 is carried by a piston rod, to which a piston, sliding in a cylinder 25 is fixed, and pressure fluid is admitted to and released from this cylinder by the operation of a three-way electrically controlled valve 26. When the pusher 24 is retracted to normal position, not shown, its inner surface is flush with the inner surface of the guard rail 21, thus permitting the carton V to be advanced by the conveyor Z until it is stopped by engagement with the fixed stop member 21a. However, when the pusher 24 is advanced to the full line position shown in FIG. 2, it pushes a carton over into contact with the rail member 22a so that it escapes the stop 21a and may then be advanced by the conveyor to the station B. At the outlet to the station B, in the direction of travel of the conveyor Z, movable stops 27 are arranged, and at the extreme end of the conveyor Z, beyond the packing unit $U^2$, there is arranged a fixed stop 28.

At the outlet to the station E, movable stops 32 are arranged, and at the outlet to station H, movable stops 33 are arranged. In the same way at the outlet to station F there are movable stops 34; at the outlet to station J there are movable stops 36, and movable stops 35 at the outlet to station $L^1$.

Figure 3:
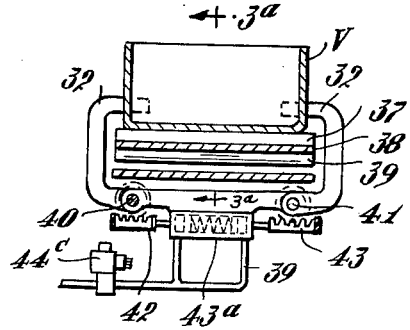
FIG. 3 is a section to larger scale on the line 3—3 of FIG. 2.

All of these movable stops are normally in position to prevent the escape of a carton in the direction of the arrow (FIG. 2), from the respective station, but the stops in each instance may be retracted by means such, for example, as illustrated in FIG. 3, to permit the passage of a carton.

Figure 3A:
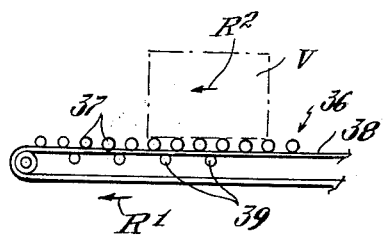
FIG. 3a is a diagrammatic vertical section on the line 3a—3a of FIG. 3.
Figure 4:
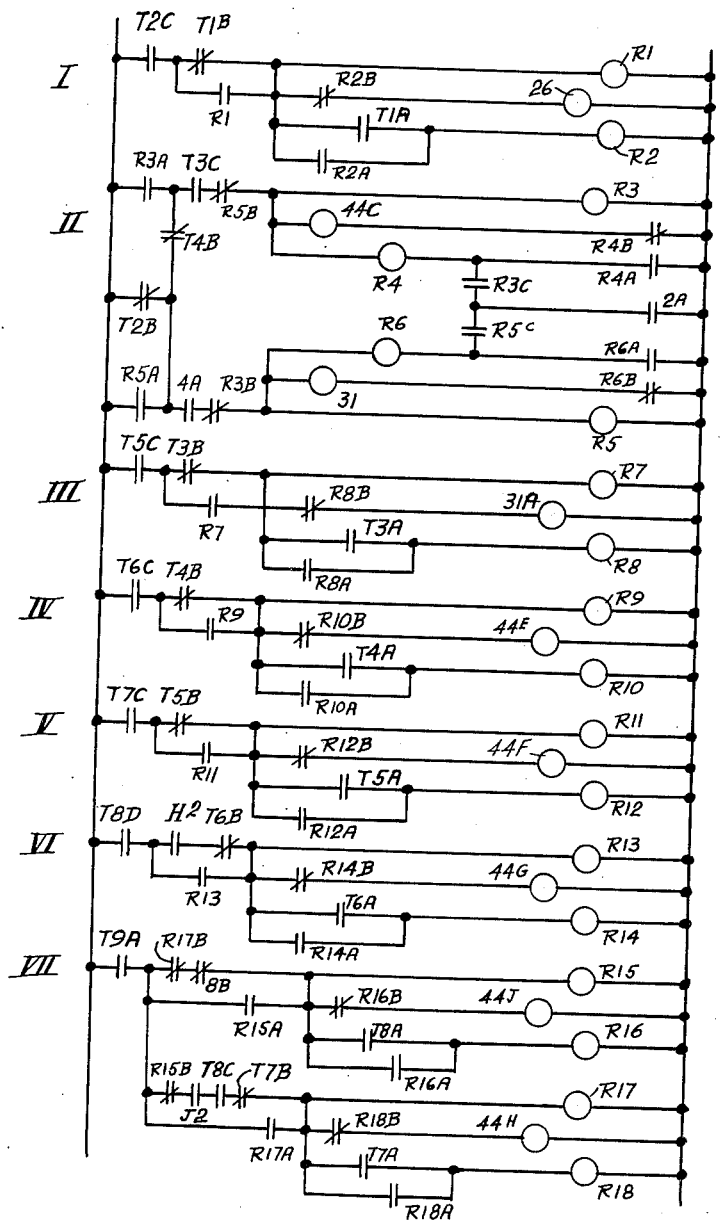
FIG. 4 is a wiring diagram illustrating an electrical network useful in the control of the apparatus of FIG. 2.

As shown in FIGS. 3 and 3a, the means for advancing articles from stations B and C to the respective packer units $U^1$ and $U^2$ is, in each instance, a conveyor device, herein referred to as a "serving conveyor," comprising a series of freely rotatable rolls 37 which support the carton V, and an endless belt 38 which underlies the series of rolls 37 and which is supported by a second series of rolls 39. This belt 38, being constantly driven in the direction of the arrow R¹ (FIG. 3a), turns the rolls 37 in a counterclockwise direction and thus advances the carton V in the direction of the arrow R² (FIG. 3a).

Below the lower run of the belt 38 there is arranged a fixed support having bearings for a pair of parallel shafts 40 and 41. These shafts have fixed thereto, respectively, gear wheels which mesh with racks 42 and 43 which are actuated by pistons within a cylinder 43a, having a spring interposed between the pistons and with provision for admitting pressure fluid to the opposite ends of the cylinder, the admission and release of pressure fluid being controlled by a three-way valve 44c which is electrically operated. Similar solenoid-operated valves (FIG. 4) 44e, 44f, 44g, 44h and 44j are provided for actuating the other pairs of movable stops above referred to. A lever arm is fixed to each shaft 40 and 41, respectively, and these arms terminate in stops shown in FIG. 3, for example, as the stops 32. Normally, the action of the spring, interposed between the pistons, is such as to move the rack members 42 and 43 outwardly, thereby swinging the levers so as to position the stops 32 in the path of the carton V, but when pressure fluid is admitted to the cylinder, the racks are moved inwardly, thus swinging the levers so as to withdraw the stops 32 from the path of the carton so that the latter is permitted to advance by the action of the conveyor.

The pusher P, comprised in the packer unit U¹, is carried by a piston rod secured to a piston (not shown) which slides in a cylinder 30 mounted upon the supporting base S¹, and pressure fluid may be supplied to the opposite ends of the cylinder under the control of a four-way valve 31 which is electrically actuated. A similar cylinder 30' mounted on the base S² of the unit U² actuates a pusher (not shown in FIG. 2, but which functions like the pusher Q of FIG. 1), under the control of an electrically actuated valve 31a.

Associated with the station A there is a photo-electric detector or "eye" T¹, comprising a light source arranged to direct a beam of light diagonally across the outlet to the station A. Similarly, at the outlet station B, there is a photo-electric detector T² comprising a light source which directs a beam of light diagonally across the outlet to the station B. A photo-electric detector T³ directs a beam diagonally across the outlet to station C; a photo-electric detector T⁴ directs a beam diagonally across the outlet to station E; a photo-electric detector T⁵ directs a beam diagonally across the outlet to station F; a photo-electric detector T⁶ directs a beam across the outlet to station H; a photo-electric detector T⁷ directs a beam diagonally across the outlet to station J; a photo-electric detector T⁸ directs a beam diagonally across the outlet to station L¹; and a photo-electric detector T⁹ directs a beam directly across the conveyor W at the position of a carton, indicated by the character M'.

*Operation*

The sequence of the mechanical operations of the machine as controlled by the electrical system are as follows:

To place the machine in operation, first the air must be turned on to operate the pneumatic carton stops and pushers, second the power to the electrical controls must be turned on and last, the power to the conveyor motors must be turned on.

Now the conveyors will be running and let us assume that at the start there are no cartons in the machines or on their conveyors. Under this condition all electric eye beams between the light sources and scanners will be unbroken. All carton stops will be in position over the conveyor so as to stop any carton arriving at that station. The carton pushers at stations A, B and C will be in the retracted position.

The electric eye at each station is there to indicate whether a carton occupies the station or not, and to operate the carton stops in such a manner and sequence as to keep a constant supply of cartons travelling to each packer unit as required. Also, that the output from the units do not jam, but combine together on the discharge conveyor.

When an electric eye beam is unbroken, indicating that the station is empty, it will call for a carton from its preceding station, and if the preceding station has a carton occupying it, the carton stop of that station will operate and release the carton. If the preceding station has no carton, its carton stop will not operate until the carton does arrive at that station to actuate the electric eye. When the first of a line of cartons arrives at station A, it will be stopped by the carton stop 21a.

For a carton to be released by station A to go to station B, two conditions must exist at the same time. First, electric eye beam from light source T² must not be broken, indicating that station B is empty. The electric eye beam from source T¹ at the outlet to station A must be broken, indicating that there is a carton at this station. When these two conditions exist at the same time, pusher 24 at station A pushes the carton past the carton stop 21a. The conveyor then proceeds to carry the carton to station B.

After the carton leaves station A, the electric eye beam at station A is restored and the pusher 24 will retract to its normal position. The next carton will move forwardly to occupy station A and again break the electric eye beam. The second carton, now in station A, will not be released at this time due to the memory circuit, which remembers that a carton is already on its way to station B. The first carton must reach station B, break the electric eye beam from source T² and be released from station B before the second carton is released from station A.

The first carton reaching station B will be simultaneously called for by stations C and E. Under this condition, the electric circuitry will give station E preference over station C, and pusher P at station B will be actuated and push the carton off of conveyor Z onto the serving conveyor which supplies unit U¹. When the first carton has been released from station B, the second carton will be released from station A. The second carton, upon reaching station B, will be released to station C, providing the first carton is still at station E. Otherwise, if the first carton has advanced to station H, and station E is empty, the second carton from station B will go to station E instead of station C. The cartons will advance in this manner from station to station until the cartons arrive at stations H and J, which are the loading stations, and all preceding stations are occupied. The cartons at stations H and J will remain there until they are filled.

When carton at station H is filled, a switch H² will be actuated to remove stops 33, and the carton will thereby be released and will pass on to the discharge conveyor W. The discharge conveyor W will carry the carton down to the carton stop 35 at station L¹. The next carton arriving at station H cannot be released from station H while station L¹ is occupied. When the carton reaches station L¹, and breaks the electric eye beam from light source T⁸, the carton stops 35 at station L¹ will be energized to release the carton, providing no other carton is on the conveyor between stations L¹ and M¹. If there is a carton between stations L¹ and M¹, the carton at station L¹ will be held until the discharge conveyor is clear between stations L¹ and M¹.

A carton at station J, when filled, will actuate switch J². This will release the stops 36 and the carton will move onto the discharge conveyor W, providing no other carton is on the discharge conveyor between stations L¹ and M¹. The carton at station J will be held there until the conveyor is clear between stations L¹ and M¹. If there are two cartons, one at station J and one at station L¹, ready to be released at the same time, the carton at station $L^1$ will receive preference and will be released first.

A carton, after being released from either stations $L^1$ or J, must pass along the discharge conveyor W until it reaches station $M^1$. Station $M^1$ has no carton stop so the cartons continue to pass through this station without stopping. The carton does, however, interrupt the electric eye beam from source $T^9$ at station $M^1$. This electric eye at station $M^1$ is used to reset the memory circuit. When a carton has been released from either stations J or $L^1$, both stations J and $L^1$ are locked out until a carton passes through station $M^1$ and interrupts the electric eye beam.

Control Circuit

The wiring diagram (FIG. 4) is divided into seven (7) sections or circuits. Each circuit is identified by a Roman numeral from I to VII.

Circuit I refers to the control wiring between station A and station B. This section comprises the circuit of solenoid valve 26 which actuates pusher 24; two control memory relays $R^1$ and $R^2$; and the contacts $T^{1A}$, $T^{1B}$ and $T^{2C}$ of electric eyes $T^1$ and $T^2$ respectively. When both stations are empty both electric eye beams will be unbroken, so that the circuits of electric eyes $T^1$ and $T^2$ will be energized. Referring to section I, under these conditions, contact $T^{2C}$ of electric eye $T^2$ will be closed; contact $T^{1A}$ of electric eye $T^1$ will be closed; and contact $T^{1B}$ of electric eye $T^1$ will be open. When an empty carton, coming along the feed conveyor, reaches station A, the light beam of electric eye $T^1$ will be broken. This will cause electric eye circuit to de-energize and contact $T^{1A}$ will open and contact $T^{1B}$ will close. This will energize solenoid valve 26 and relay $R^1$. When solenoid valve 26 energizes, it will cause plunger 24 to displace the carton so that it can pass stop 21a and the conveyor will then carry the carton towards station B. When relay $R^1$ energizes, its contacts $R^{1A}$ will close, locking in the relay.

As the carton moves out of the light beam of electric eye $T^1$, contact $T^{1A}$ will close, energizing relay $R^2$. This in turn will cause relay contacts $R^{2A}$ to close, locking in relay $R^2$, and contact $R^{2B}$ opens, de-energizing solenoid valve 26. This will cause pusher 24 to retract allowing a second carton to proceed to station A.

Upon breaking of the beam of electric eye $T^1$ by the second carton, this carton will not be released at once from stop 21a, as the memory circuit remembers that there is a carton between stations A and B. When the first carton reaches station B, the light beam is broken at electric eye $T^2$. Electric eye $T^2$ contacts $T^{2C}$ will open and de-energize relays $R^1$ and $R^2$, resetting the (memory) circuit.

When the first carton to reach station B is released and proceeds to either station C or station E, the light beam of electric eye $T^2$ is remade. This will cause its contacts $T^{2C}$ to close and energize solenoid valve 26 and relay $R^1$ again and release another carton from station A, and the sequence of the circuit is started over.

Circuits III, IV and V are identical to circuit I, the contacts of these circuits which correspond to the contact $T^{2C}$ of circuit I, being designated $T^{5C}$, $T^{6C}$ and $T^{7C}$, respectively.

Circuit I as above described is the control circuit between stations A and B. Circuit III is the control circuit between stations C and F. Circuit IV is the control circuit between E and H. Circuit V is a control circuit between stations F and J.

Circuit VI is the control circuit between stations H and $L^1$, and is also identical to circuit I except for an additional switch $H^2$ located at the loading station H. This switch is actuated when the carton at station H becomes filled. In this circuit the contact which corresponds to the contact $T^{2C}$ of circuit I is designated $T^{8D}$. Even though station $L^1$ is empty and calling for the carton at station H, the carton cannot be released until it is filled and actuates switch $H^2$.

Circuit II is the control wiring between stations B, C and E. When all three stations are empty, all light beams are unbroken and all electric eye relays are energized. Electric eye contacts $T^{2A}$ will be closed and $T^{2B}$ will be open. Contacts $T^{3C}$ will be closed. Contacts $T^{4A}$ will be closed and $T^{4B}$ will be open.

When a carton arrives at station B, the light beam of electric eye $T^2$ will be broken. This will cause contacts $T^{2A}$ to open and contacts $T^{2B}$ to close. This will energize relay $R^5$ and solenoid valve 31. The energizing of relay $R^5$ closes contacts $R^{5A}$, $R^{5C}$ and opens $R^{5B}$. This locks in relay $R^5$ and locks out relay $R^3$.

The energizing of solenoid valve 31 causes pusher P to push the carton off of the conveyor Z onto a conveyor which serves packing unit $U^1$, causing the light beam of eye $T^2$ to be restored and thus energize its circuit. When the circuit of electric eye $T^2$ is energized, contacts $T^{2A}$ will close and contacts $T^{2B}$ will open. This will cause relay $R^6$ to energize. When relay $R^6$ energizes, contacts $R^{6A}$ will close and contacts $R^{6B}$ will open. This locks relay $R^6$ in circuit and de-energizes solenoid valve 31, causing plunger P to go back into its original inoperative position. When a carton reaches station E and breaks the beam of electric eye $T^4$, contacts $T^{4A}$ will open, de-energizing relays $R^5$ and $R^6$, and resetting the memory circuit. Also contacts $T^{4B}$ will close, setting up a control circuit between station B and station C. As soon as the next carton arrives at station B and breaks the beam of electric eye $T^2$, contact $T^{2B}$ will close energizing relay $R^3$ and a solenoid valve 44 (like the solenoid valve 44, shown in FIG. 3). Contacts $R^{3A}$ and $R^{3C}$ will close and contacts $R^{3B}$ will open, locking out station C. Solenoid valve 44C energizes and operates to release the carton stops 27, releasing the carton to proceed to station C. As the carton leaves station B, the light beam of electric eye $T^2$ is remade which causes contacts $T^{2B}$ to open, and $T^{2A}$ to close. This will cause relay $R^4$ to energize. When relay $R^4$ energizes, its contacts $R^{4A}$ will close, locking in the relay, and contacts $R^{4B}$ will open, causing solenoid valve 44C to de-energize. This will allow carton stops 27 at station B to return to operative position. When a carton reaches station C, breaking the beam of electric eye $T^3$, the electric eye's circuit will de-energize, opening contacts $T^{3C}$. This will de-energize relays $R^3$ and $R^4$ and reset the memory circuit.

Circuit VII: If stations J, $L^1$ and $M^1$ are empty, the beams of electric eyes $T^7$, $T^8$ and $T^9$ will not be broken and the electric eye circuits are energized. This will close the contacts $T^{9A}$. Contacts $T^{8A}$, $T^{8C}$ and $T^{7A}$ will be closed. Contacts $T^{8B}$ and $T^{7B}$ will be open.

When a carton enters station $L^1$, it will break the beam of electric eye $T^8$. This will cause contacts $T^{8A}$ and $T^{8C}$ to open and $T^{8B}$ to close and will cause relay $R^{15}$ and a solenoid valve 44J (FIG. 4), (corresponding to valve 44C of FIG. 3), to energize. Contacts $R^{15A}$ will close and contacts $R^{15B}$ will open. This will lock relay $R^{15}$ in circuit and lock out station J. Energizing of the solenoid valve 44J will release the carton stops 35 and allow the carton to escape from station $L^1$.

This carton will proceed along the discharge conveyor W towards station $M^1$. When the carton has passed by the electric eye $T^8$, the light beam will be restored and the electric eye circuit is re-energized. This will cause contact $T^{8B}$ to open and $T^{8A}$ and $T^{8C}$ to close. The closing of contact $T^{8A}$ will energize relay $R^{16}$ and when relay $R^{16}$ energizes, contacts $R^{16A}$ will close, locking relay $R^{16}$ in circuit and $R^{16B}$ will open, de-energizing the solenoid valve 44J and restoring stops 35 to operative position.

If another carton enters station $L^1$ and breaks the light beam of electric eye $T^8$, carton stops 35 will not become operative, since the memory relays $R^{15}$ and $R^{16}$ hold the carton stops 35 of station $L^1$ locked out. This condition will exist until the first carton passes station $M^1$ and breaks the beam of electric eye $T^9$. This will cause contacts $T^{9A}$ to open, resetting the memory circuit. When a carton arrives at loading station J, it breaks the beam of electric eye T⁷. This causes contacts T⁷ᴬ to open and T⁷ᴮ to close. When the carton is filled, it will actuate switch J², located at station J. This will complete the circuit and energize relay R¹⁷ and a solenoid valve 44H (FIG. 4), (similar in function to valve 44C, FIG. 3). Contacts R¹⁷ᴬ will close and R¹⁷ᴮ will open, locking in relay R¹⁷ and locking out station L¹. The energizing of solenoid valve 44H will cause carton stops 36 to release the carton onto discharge conveyor W and the carton will then proceed towards station M¹. As soon as the carton has passed the beam of electric eye T⁷, this beam will be restored and the electric eye circuit will be energized. This will cause contacts T⁷ᴮ to open and T⁷ᴬ to close. The closing of contacts T⁷ᴬ will energize relay R¹⁸. When relay R¹⁸ energizes, contacts R¹⁸ᴬ close and R¹⁸ᴮ open, locking in relay R¹⁸ and de-energizing solenoid valve 44H. This then restores carton stops 36 to operative position. When another carton enters station J and is filled, the carton stops 36 cannot operate as the memory relays R¹⁷ and R¹⁸ have station J locked out. This condition exists until the first carton passes station M¹ and actuates electric eye T⁹. This will cause contacts T⁹ᴬ to open resetting the memory circuit.

*Modified Carton Conveyor System To Feed and Discharge Two or More Machines, in Which the Cartons Are Pushed From Station to Station*

Figure 5:
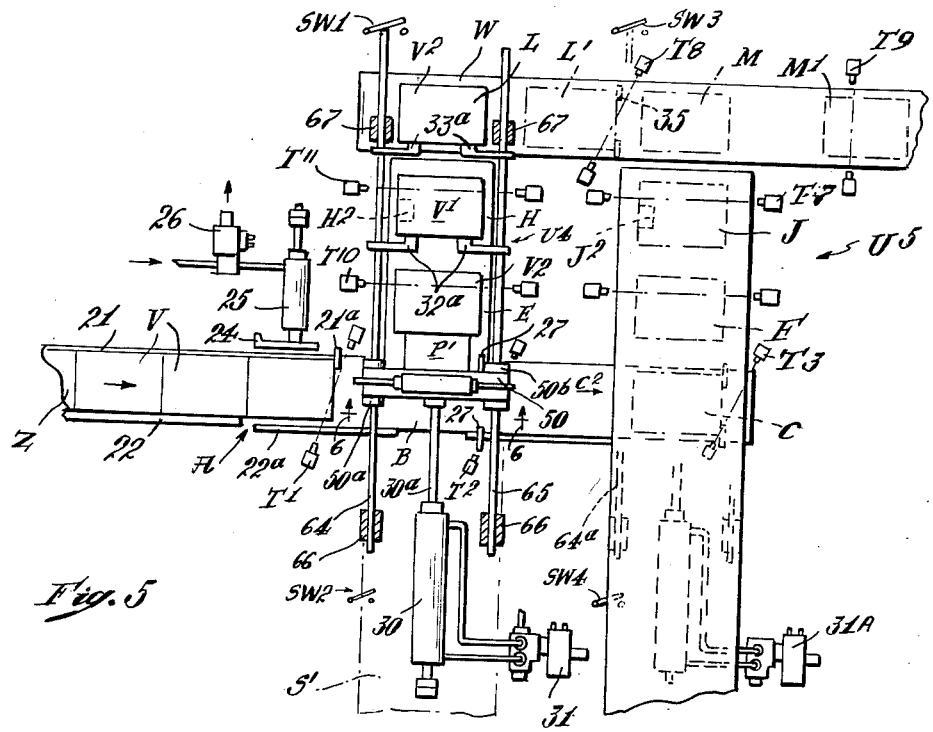
FIG. 5 is a view similar to FIG. 2, but illustrating a slight modification.
Figure 6:
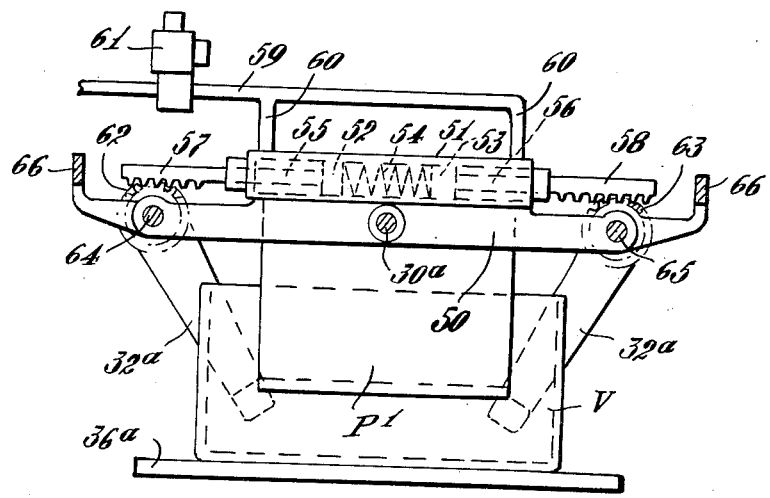
FIG. 6 is a section to larger scale on the line 6—6 of FIG. 5.

Apparatus of the same general construction and which is designed for the same purpose as that above described, but which differs in minor details, is disclosed in FIGS. 5 and 6. In these views parts corresponding to those of FIGS. 2 and 3 and similarly designated, and in FIG. 5 only one packing unit U⁴ is fully shown, it being understood that one or more additional units, each identical with the one illustrated, may be provided, for example, as illustrated in FIG. 2.

Referring to FIG. 5, the supply conveyor Z advances empty cartons or cases V along a rectilinear path toward the transfer station B, from which the cartons may continue to advance in the direction of the arrow C², toward another transfer station C or, alternatively, may be switched to station E; then pass on to station H; and thereafter move to station L¹ where the carton is taken by the delivery conveyor W. Cartons advanced toward station B may be temporarily stopped at station A by the stop member 21a, but at a proper time are disengaged from the stop by the pusher 24 and advanced by the conveyor Z into station B.

In this arrangement, the cartons, as they move from station B to stations E, H and L, are suppotred by a smooth-surfaced dead-plate 36a (FIG. 6), along which they are pushed by apparatus, such as is illustrated in FIGS. 5 and 6. The dead-plate and the cooperating pushing device constitute a serving conveyor for supplying articles to a single processing unit. As shown in FIG. 5, parallel rocker shafts 64 and 65 are arranged at opposite sides, respectively, of the path of travel of the cartons as they move from station B toward station L, the shafts being supported to rock and also to slide longitudinally in fixed bearings 66 and 67.

A carriage 50 (FIG. 5) is supported by the shafts, the carriage having bores in which the shafts turn freely, but the carriage is prevented from moving axially relatively to the shafts, by stop collars 50a and 50b. A fluid pressure motor, comprising a horizontal cylinder 51 (FIG. 6) is mounted on the carriage. Two spaced pistons 52 and 53 are arranged within the cylinder, a coil spring 54 between the pistons urging them apart. These pistons have rods 55 and 56, respectively, which pass through stuffing boxes at opposite ends of the cylinder and which, outwardly beyond the ends of the cylinder, carry toothed rack members 57 and 58, respectively. A pipe 59, leading from a supply of pressure fluid, for example, compressed air, has branches 60 leading to opposite ends of the cylinder, and admission of air to, and its exhaust from the cylinder is controlled by the four-way solenoid-actuated valve 61. Gears 62 and 63, fixed to the shafts 64 and 65, respectively, mesh with the racks 57 and 58 and thus, rocking motion of the shafts results from the motion of the pistons 52 and 53 toward and from each other. To each of the shaft 64 and 65 axially spaced pusher arms are fixed. Arms 32a are opposed to each other to form one pair and the arms 33a are opposed to each other to form a second pair, one arm of the pair being fixed to each respective shaft. The arms are so located that as the shafts move longitudinally, the arms 32a travel from a position at which they are near the entrance to station E to a position such as shown in FIG. 5, at which they are near the entrance to station H, while the arms 33a of the other pair, are so located that as the shafts move axially, these arms travel from a position approximating the position of arms 32a, as shown in FIG. 5, to the position in which the arms 33a are indicated in FIG. 5.

Referring to FIG. 6, the arms 32a, for example, are shown as provided with rigid angle members 66 which constitute stops which, by engagement with a portion of the carriage, limit the downward and outward swing of the lower ends of the arms. In this view, the arms are shown in operative position.

Referring to FIG. 5, the base member S¹ of the packing unit U⁴ carries the cylinder 30 of a fluid pressure motor like that illustrated in FIG. 2, this cylinder being supplied with pressure fluid under control of the four-way solenoid valve 31. However, in this arrangement, instead of a pusher like the pusher P of FIG. 2, the end of the piston rod 30a of this pusher motor is fixed to the carriage 50 so that as the piston reciprocates in the cylinder 30, the carriage is moved longitudinally together with the rocker shafts 64 and 65. To the opposite end of the carriage, from that to which the piston rod is connected, there is mounted a pusher pad P¹ (FIG. 6) which reaches down into the path of travel of the cartons V so that by contact with a carton it may push the carton along the dead-plate.

Assuming that the station B is empty, the carriage 50 at such time will be retracted until it substantially contacts the end of the cylinder 30, the shafts 64 and 65 sliding longitudinally in their bearings as the carriage is retracted, and carrying with them the pusher arms 32a and 33a. When the carriage is fully retracted, the vertical face of the pad P¹, which is designed to contact the carton, is substantially in the plane of the right-hand edge of conveyor Z so that it does not obstruct the entrance of a carton into the station B.

Assuming further that the parts are in this retracted position and that a carton enters station B and is to be moved toward station L¹, fluid will be admitted to cylinder 30 so as to move the carriage, and by means of the pad P¹ to push the carton from station B into station E where it will occupy the position indicated in FIG. 5. Before the advance of the carriage for moving a carton from the sation B toward the station E, the shafts 64 and 65 will have been rocked so as to move the arms 32a up to the operative position shown in FIG. 6. In this position, as the carriage now advances, these arms contact the rear wall of the carton V and advance it to the position indicated at V¹ at station H. The shafts 64 and 65 are now again rocked to swing the pusher arms down and the carriage is retracted to permit another carton to enter station B. Before the carriage again advances the shafts are rocked to move the arms 32a and 33a into operative position, and as the carriage now advances, it may push a carton from the station B to the station E, a carton from the station E to the station H, and a carton from the station H to the station L as shown at V². Thus, with this arrangement the cartons are moved from station to station by the reciprocating carriage rather than by a continuously moving conveyor, and it is not necessary to employ movable stops for limiting the advance of a carton from station to station as it moves from the station B toward the station L. However, as in the arrangement previously described, a fixed stop 21a, cooperating with the pusher 24, determines the delivery of cartons from station A to station B, and likewise movable stops 27 determine the advance of cartons from station B in the direction of the arrow $C^2$.

In this arrangement, switches $SW^1$, $SW^2$, are arranged in the paths of the ends of the shaft 64 so that as the shaft moves endwise it actuates these switches. Similar switches $SW^3$ and $SW^4$ (FIG. 5) will be actuated by the shaft 64a of the next adjacent packer unit.

To place the packer machine in operation, first the air must be turned on to operate the pneumatic carton stops and carton pushing carriages; second the power to the electrical controls must be turned on; and last, the power to the conveyor motors must be turned on. In the following description, referring to FIGS. 5, 6 and 7, it is assumed that the apparatus includes two packer units, like the units $U^1$ and $U^2$ of FIG. 2, and that cartons which are advancing by the conveyor Z in the direction of arrow $C^2$, after leaving transfer station B of the unit $U^4$ will be delivered to the transfer station C of unit $U^5$.

Let it be assumed that the conveyors are running and that, at the start, there are no cartons in the machines or on their conveyors. Under this condition, all electric eye beams between the light sources and scanners will be unbroken. All carton stops will be in position over the conveyor so as to stop any carton arriving at that station. The carton pushing devices at stations A, B and C will be in the retracted or inoperative position.

Each carton pushing carriage 50 has the carton-pushing fingers 32a, 33a which move up and down. They are so moved as to be in the down position when the carriage is in the retracted position. When these fingers are in the down position, advance of the carriage causes these fingers to propel the cartons from one station to another. When the carriage reaches the limit of its forward stroke the fingers are moved out of the path of the latter when the carriage retracts to its original position. On reaching this position, the fingers are again moved down into operative position and are ready to push the next carton when the carriage again advances.

The electric eyes at each station are there to indicate whether a carton occupies the station or not, and to operate the carton stops and carton-pushing carriages and arms in such a manner and sequence as to keep a constant supply of cartons travelling to each machine as required. Also to provide that the outputs from the several machines do not jam, but take their places, without interference, on the discharge conveyor.

When an electric eye beam is unbroken, indicating that, that station is empty, it will call for a carton from its preceding station, and if the preceding station has a carton occupying it, either the station will be made inoperative or the pusher carriage of that station will operate and the carton will be advanced to the next station.

Operation

When a line of cartons arrives at station A, it will be stopped by the carton stop 21a at that station. For a carton to be released by station A to go to station B, three conditions must exist at the same time. First, the electric eye beam at station B must not be broken, indicating that the station is empty. The electric eye beam at station A must be broken, indicating that there is a carton at this station.

Third, pusher carriage of packer unit $U^4$ must be in the full retracted position. When these three conditions exist at the same time, pusher 24 at station A pushes the carton past the carton stop 21a. The conveyor Z then proceeds to carry the carton to station B. After the carton leaves station A, the beam of electric eye $T^1$ at station A is remade and the pusher carriage 50 will retract to its normal position. The next carton will move forward to occupy station A and break the beam of electric eye $T^1$. This second carton, now in station A, will not be released at this time due to the memory circuit, which remembers that the first carton is already on its way to station B. The first carton must enter station B far enough to break the beam of electric eye $T^2$ and thereby to be released from station B before the second carton is released from station A.

The first carton, as it enters station B will be simultaneously called for by stations C and E. Under this condition, the electric circuitry will give station E preference over station C and pusher pad $P^1$ at station B will be actuated and push the carton off conveyor Z into station E, and retract to its original position.

If there is no carton at station A, the pusher at the next advance of the carriage, will engage the arms 32a with the carton V and push the carton from station E to station H. But, if there is a carton at station A, the carton pusher carriage will dwell until a carton has been released from station A and arrives at station B. Then, as the carriage advances, the pusher pad $P^1$ will push the carton from station B to station E while the pusher arms 32a will move the first carton V from station E to station H.

However, as will hereafter be pointed out more fully, when station H is occupied by a carton the further admission of cartons at gateway station A is prevented until station H is again empty (assuming that there is no other loading station which is empty at the same time). Nevertheless, if a carton arrives at station B under these conditions, it may be permitted to pass on to station C if station C is then empty. If such is the case, carton stop 27 will be retracted to release the carton from station B and the carton will be carried by the conveyor to station C.

The carton on arriving at station C will be pushed by a carriage (like carriage 50, but not here illustrated) to a station corresponding to station F of FIG. 2, providing that the next station, corresponding to station J, of FIG. 2, is empty. If there is another carton at station B when the carton pusher at the second packing machine arrives at its fully retracted position, the pusher carriage of the second machine will remain in this position until the carton at station B is released and arrives at station C. Then the carton pusher carriage of the second machine will push both cartons, the carton at station F to station J and the carton at station C to station F. If, however, there is no carton at station B when the carton pusher of the second machine retracts, it will actuate again and push the carton at station F to station J.

Cartons arriving at stations H and J (which are the loading stations) will remain there until they are filled.

If the carton at station H becomes filled, switch $H^2$ will be actuated and, at its next forward movement, the pusher carriage 50 will push the filled carton onto discharge conveyor W providing the following conditions exist: (I) There is no carton at station $L^1$. (II) There is no carton in the process of moving from station A to station B or from station B to station C and a carton is dwelling at station B.

When carton at station H is filled and pushed onto the discharge conveyor, it is carried down to the carton stop 35 at station $L^1$. When the carton reaches station $L^1$ and breaks the electric eye beam, the carton stop at station $L^1$ will be retracted to release the carton, providing no other carton is on the conveyor between stations $L^1$ and $M^1$.

If there is a carton between stations $L^1$ and $M^1$ the carton at station $L^1$ will be held until the discharge conveyor is clear between stations $L^1$ and $M^1$.

A carton at station J, when filled, will cause switch $J^2$ to actuate. This will cause the carton pusher carriage of the second packer unit to push the filled carton onto the discharge conveyor W, providing the following conditions are met. (I) There is no carton on discharge conveyor W between station $L^1$ and station $M^1$. (II) There is no carton in the process of moving from station B to station C. If there are two cartons, one at station J and one at station $L^1$, ready to be released, at the same time, the carton at station $L^1$ will receive preference and will be released first. A carton, after being released from either stations J or $L^1$, must pass along the discharge conveyor W until it reaches station $M^1$. Station $M^1$ has no carton stop, so the cartons continue to pass through this station without stopping. The carton does, however, interrupt the electric eye beam at station $M^1$. This electric eye at station $M^1$ is used to reset the memory circuit. When a carton has been released from either stations J or $L^1$, both stations J and $L^1$ are locked out until a carton passes through station $M^1$ and interrupts the beam of electric eye $T^9$.

*Control Circuit*

The wiring diagram (FIG. 7) is divided into seven (7) sections or circuits. Each circuit is identified by a Roman numeral from I to VII.

Circuit I refers to the control wiring between station A and station B. This section consists of solenoid valve 26 for the pusher at station A; two control memory relays $R^1$ and $R^2$, and contacts $T^{2A}$ of electric eye $T^2$ and contacts $T^{1A}$ and $T^{1B}$ of electric eye $T^1$. Also there are two sets of contacts $R^{3B}$ of relay $R^3$ of circuit II and $R^{15B}$ of relay $R^{15}$ of circuit III. Relay $R^{14}$ is energized every time the contacts $T^{2A}$ of electric eye $T^2$ are closed and its contacts are used for controlling the operation of the pusher carriage at station B (circuit III).

When both stations A and B are empty, the beams of both electric eyes $T^1$ and $T^2$ will be unbroken, so that the circuits of electric eyes are energized. Referring to circuit I, under these conditions, contact $T^{2A}$ of electric eye $T^2$ will be closed, and contact $T^{1A}$, of electric eye $T^1$ will be closed. Contact $T^{1B}$ of electric eye $T^1$ will be open. When an empty carton, coming along the feed conveyor A, arrives at station A, the beam of electric eye $T^1$ will be broken. This will de-energize the circuit of electric eye $T^1$. Contact $T^{1A}$ will open and contact $T^{1B}$ will close and cause solenoid valve 26 to actuate pusher 24 to free the carton from stop 21a providing that relay $R^3$ is energized (circuit II) and relay $R^{15}$ is de-energized (circuit III), so that contacts $R^{3B}$ and $R^{15B}$ are closed. This insures that the pusher carriage at station B is fully retracted before pusher 24 at station A can be actuated to release a carton. Relay $R^1$ will also be energized, closing its contact $R^{1A}$ and locking $R^1$ relay and solenoid valve 26 in the circuit. When the carton moves on and out of the range of electric eye $T^1$ and the light beam is remade, contacts $T^{1A}$ will close, energizing relay $R^2$. This in turn will cause relay contacts $R^{2A}$ to close and contacts $R^{2B}$ to open, locking in relay $R^2$ and de-energizing solenoid valve 26. This will cause the pusher carriage at station B to retract, allowing a second carton to proceed to station A.

Upon breaking of the beam of electric eye $T^1$ by this second carton, this carton will not be released, as the memory circuit remembers that there is a carton between stations A and B. When the first carton has fully entered station B, the light beam there will be broken at electric eye $T^2$. This will open contacts $T^{2A}$ and de-energize relays $R^1$ and $R^2$, resetting the (memory) circuit. When the first-named carton, which has reached station B, is released from B to go either to station C or station E, and the beam of light of electric eye $T^2$ is remade, this will close contacts $T^{2A}$, allowing a second carton to be released from station A and the sequence of the circuit is started over.

Circuit II is the wiring of the control for the pusher fingers 32a and 33a of the first packer unit $U^4$, FIG. 5.

Switches $SW^1$ and $SW^2$ are momentary contact switches. $SW^1$ switch is actuated by the shaft 64 when the pusher carriage 50 reaches its full forward position. $SW^2$ switch is actuated by the shaft 64 when the pusher carriage reaches its full retracted position.

When the pusher carriage is in its retracted position and switch $SW^2$ is closed, solenoid valve 61 (FIG. 6) and both relays $R^3$ and $R^{16}$ will be energized. Contacts $R^{3A}$ will close, locking in both relays and the solenoid valve 61. When solenoid valve 61 is energized, it so controls the motor comprising the cylinder 51 as to cause the fingers 32a and 33a to swing down into the carton path, see FIG. 6.

When the pusher carriage is advanced, the fingers will push any carton which may be in front of them from one station to another and when the pusher carriage reaches its full forward position, switch $SW^1$ is opened, thereby breaking the circuit and causing relays $R^3$ and $R^{16}$ and solenoid valve 61 to de-energize. The de-energizing of solenoid valve 61 will cause the motor to swing fingers 32a and 33a upward and away from the carton path so that when the pusher is retracted, the fingers will pass any carton in said path without contacting it. The de-energizing of relay $R^3$ will cause contacts $R^{3A}$ to open, so that when the pusher carriage is retracted and switch $SW^1$ closes, solenoid valve 61 will not be energized again until the pusher carriage has reached its full retracted position and closes switch $SW^2$.

Circuit III refers to means for controlling the advance and retraction of the pusher carriage of the packer unit $U^4$. This circuit consists of relays $R^4$, $R^8$, $R^9$ and $R^{15}$, and solenoid valve 31.

When solenoid valve 31 is energized, it causes the pusher carriage to move forward and push any carton which may be at any of stations B, E or H to its next station, i.e., a carton at B would go to station E, and a carton at station E would be pushed to station H. A carton on station H would be pushed onto the discharge conveyor W to be carried down to station $L^1$.

Figure 7:
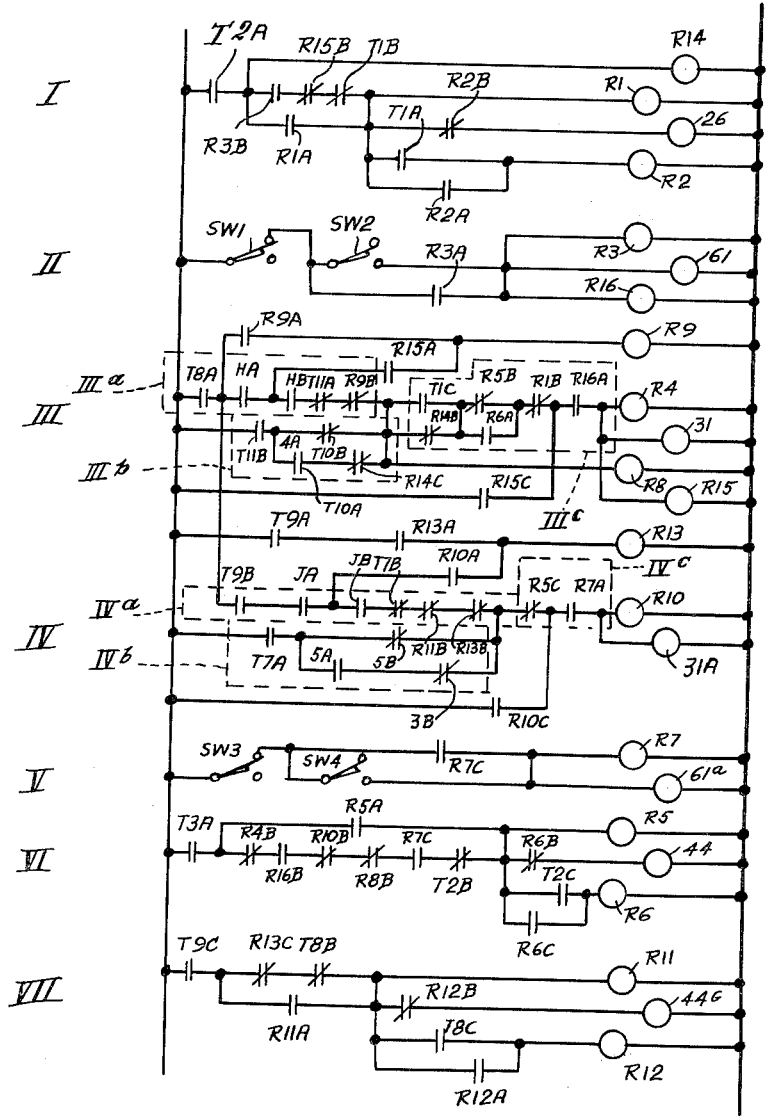
FIG. 7 is a wiring diagram illustrating an electrical network useful in the control of apparatus such as that shown in FIG. 6.

In this circuit (III), as shown in FIG. 7, some of the relay contacts have been arranged in three groups, as indicated by the enclosing dotted lines. Group IIIA includes the control and interlocking contacts which control the delivery of a filled carton onto the conveyor W. Group IIIB includes the contacts involved in controlling the advance of the carton over the dead plate 36a (FIG. 6) of the packer unit $U^4$, from station B to station H. These contacts, in group IIIB are those of electric eyes $T^2$, $T^{10}$, and $T^{11}$, and they determine the advance of any carton at station B or station E to station H, which is the loading station. Group IIIC includes the interlocking contacts for the feed end circuitry controlling the pusher carriage.

Group IIIA consists of electric eye relay contacts $T^{8A}$ and $T^{11A}$ and the contacts of switches $H^A$ and $H^B$ which respond to the release of a charge of bottles into a waiting carton. When a carton is at station H, the beam of electric eye $T^{11}$ will be broken and its circuit de-energized, so its normally closed contacts $T^{8A}$ will be open. When the charge of bottles drops into the carton, switches $H^2$ and $H^B$ are closed. If there is no carton at station $L^1$, the beam of electric eye $T^8$ will be unbroken and subsequently its circuit will be energized and its contacts $T^{8A}$ will be closed. Relay $R^9$, at this time, will be de-energized and its relay contacts $R^{9B}$ will be closed. This will complete the circuit through group IIIA and the first packer unit $U^4$ is ready to discharge a full carton from the machine. Group IIIA is in series with group IIIC contacts and if group IIIC contacts are closed at this time, solenoid valve 31 will energize and pusher carriage 50 will move forward, pushing the carton or cartons toward station L. In order for group IIIC contacts to complete the circuit, the following conditions must exist: (I) The pusher carriage 50 must be fully retracted so that switch $SW^2$ is closed, energizing relay $R^{16}$ (circuit II), closing contacts $R^{16A}$. (II) Relay $R^1$ (circuit I) must be de-energized so that $R^{1B}$ (IIIC) contacts are closed. These contacts are to prevent the pusher carriage from operating if station B is in the process of releasing a carton to go to station B. (III) Relay $R^5$ (circuit VI) must be de-energized so that contacts $R^{5B}$ (IIIC) are closed. These contacts are to prevent the pusher carriage from operating if carton stop 27 is in the process of releasing a carton to station C. (IV) The light beam of electric eye $T^2$ must be broken by a carton at station B, so that the circuit of electric eye $T^2$ is de-energized. This will keep relay $R^{14}$ (circuit I) de-energized and its contacts $R^{14B}$ in circuit IIIC will be closed. This will complete the circuit in group IIIC and with the circuit completed in group IIIA, relay $R^4$, relay $R^{15}$ and solenoid valve 31 will be energized, causing pusher carriage 50 to move forward, pushing all cartons toward the station L. Group IIIC contacts $R^{5B}$ are shunted by $R^{6A}$. This arrangement is used in the event that relay $R^5$, in circuit VI, is energized and contacts $R^{5B}$ are open, due to a carton at station B in the process of being released to station C. When the carton has passed the beam of electric eye $T^2$ and cleared station B, relay $R^6$ (circuit VI) will energize and close the $R^{6A}$ contacts, allowing the pusher carriage 50 of the packer unit $U^4$ to operate, before the carton reaches station C, and to reset circuit VI and close contacts $R^{5B}$.

Contact $R^{14B}$ is shunted by the closure of relay contact $T^{1B}$ of electric eye $T^1$. $R^{14B}$ contact is closed only when a carton is at station B, breaking the beam of electric eye $T^2$. If there is no carton at station B, the circuit of electric eye $T^2$ will be energized, keeping $R^{14B}$ contacts open. This will keep the pusher carriage 50 from advancing until the carton at station A is released and reaches station B and breaks the beam of electric eye $T^2$. If there is no carton at station A, the beam of electric eye $T^1$ will not be broken and its circuit will be energized and contacts $T^{1C}$ will close, shunting around contacts $R^{14B}$ to complete the circuit and the pusher carriage 50 will be able to advance a carton in the first packer unit $U^4$, even though station B is empty.

When stations B, E and H are empty, none of the light beams of electric eyes $T^2$, $T^{10}$ or $T^{11}$ is broken so that their circuits are energized. Under this condition, contacts $T^{11B}$ and $T^{10A}$ will be closed and contacts $T^{10B}$ and $R^{14C}$ will be open so the circuit through group IIIB will be open. When a carton arrives at station B, breaking the beam of electric eye $T^2$, contacts $R^{14C}$ will close, as relay $R^{14}$ will de-energize when the contacts $T^{2A}$ of electric eye $T^2$ open (circuit I). This will complete the circuit through group IIIB by way of contacts $T^{11B}$, $T^{10A}$ and $R^{14C}$. If group IIIC contacts are closed, solenoid valve 31 will energize and the pusher carriage 50 will move a carton from station B to station E and then retract. Now the light beam of electric eye $T^{10}$ at station E will be broken, causing contacts $T^{10A}$ to open and $T^{10B}$ to close. This will complete the circuit through group IIIB again, by the way of contacts $T^{11B}$ and $T^{10B}$.

If the contacts of group IIIC are still closed, solenoid valve 31 will again energize and cause the pusher carriage to push a carton from station E toward station H. If a carton was also at station B, it will have been moved to station E. Once a carton has reached station H, contacts $T^{11B}$ open and the pusher 50 cannot be operated by group IIIB contacts until station H is empty again.

Relay $R^9$ is a memory relay which becomes energized only when the contacts of group IIIA and group IIIC are closed and relay $R^{15}$ is energized, closing $R^{15A}$ contacts. When relay $R^9$ energizes it locks itself in by $R^{9A}$ contacts. The purpose of this relay is to insure that another carton cannot be released from station H until the previous carton has reached and been released from station $L^1$. When a carton is filled and is pushed onto the discharge conveyor W, relay $R^9$ will open $R^{9B}$ contacts in group IIIA. This will keep group IIIA circuit open until the carton arrives at station $L^1$ and breaks the light beam of photoelectric eye $T^8$, causing contacts $T^{8A}$ to open, de-energizing relay $R^9$.

Relay $R^8$ energizes as soon as the circuit through the contacts of group IIIA or group IIIB have been closed. This causes its contacts $R^{8B}$ in circuit VI to open, keeping carton stop 27 from retracting in case station C is calling for a carton. This gives station E preference over station C when a carton arrives at station B.

Circuit IV: This circuit controls the pusher carriage 50 for the second packer unit $U^5$ (indicated in broken lines in FIG. 5). It consists of relays $R^{10}$ and $R^{13}$ and a solenoid valve 31a, like the valve 31a of FIGS. 2 and 4. It is similar in operation to circuit III. Here again some of the contacts are placed into three groups, IVa, IVb and IVc, as indicated by the dotted lines.

Group IVa are the control and interlocking contacts controlling the discharge of a filled carton from packer unit $U^5$ (FIG. 5) onto conveyor W. Group IVb are the contacts for controlling the advance of cartons from station to station in unit $U^5$ and group IVc includes the interlocking contacts for the feed end circuitry. These three groups function the same as the three groups in circuit III.

To complete the circuit through group IVa, station $L^1$ must be empty so that the contacts $T^{8A}$ of electric eye $T^8$ in circuit IIIA are closed. A carton must be at the filling station of unit $U^5$ and must be filled, thus actuating a switch $J^2$ like the switch $J^2$ of FIG. 2, and closing its contacts $J^A$ and $J^B$. The beam of the electric eye $T^7$ at the filling station J will be broken by the carton, keeping contacts $T^{7B}$ closed. Relay $R^{11}$ in circuit VII must be de-energized, so contacts $R^{11B}$ will be closed. This is to insure that the pusher carriage of the second unit $U^5$ will not actuate and push a carton onto the discharge conveyor W if carton stop 35 is in the process of releasing a carton from station $L^1$. Relay $R^{13}$ will be deenergized at this time, keeping $R^{13B}$ contacts closed. Electric eye $T^9$ must be unbroken so its circuit is energized and its contacts $T^{9A}$ and $T^{9B}$ are closed. To complete the circuit through group IVc, two sets of contacts $R^{5C}$ and $R^{7A}$ must be closed. $R^{5C}$ contacts are to insure that pusher carriage will not operate if carton stop 27 at station B is in operation, and $R^{7A}$ contacts are to insure that the pusher will not operate until it is in the fully retracted position and closing switch $SW^4$, in circuit V, so that pusher fingers 32a and 33a will be in the down carton contact position. When the circuit is completed through both group IVa and group IVb, contacts, the carriage pushes a carton or cartons toward the next station.

Group IVb is identical in operation to group IIIb in circuit III. Relay $R^{13}$ is a memory relay which becomes energized only when group IVa and group IVc contacts are closed and relay $R^{10}$ energizes, closing $R^{10A}$ contacts. When relay $R^{13}$ is energized, it locks itself in by contacts $R^{13A}$. The purpose of this relay is to insure that another carton cannot be released from the filling station of unit $U^4$ until the previous carton has passed station $M^1$ electric eye beam. When relay $R^{13}$ becomes energized, it opens its contacts $R^{13B}$ in group IVa. This will keep group IVa circuit open until the carton passes the electric eye $T^9$ at station $M^1$.

Circuit V is the controlling circuit for the actuation of the pusher carriage, of the second packer unit $U^5$. It is identical to circuit II, except it has one relay $R^7$ instead of the relays $R^3$ and $R^{16}$ of circuit II. Switch $SW^3$ is actuated by the pusher carriage when the latter reaches its full forward position. Switch $SW^4$ is actuated by the pusher carriage when the latter is in its full backward or retracted position.

Circuit VI is the control circuit for the carton stop 27 at station B. It consists of two relays $R^5$ and $R^6$ and the solenoid valve 44 (FIG. 3). To actuate carton stop 27, the following must take place. (I) Station C must be empty and the beam of electric eye $T^3$ unbroken so that its contacts $T^{3A}$ will be closed. Relay $R^4$ in circuit III must be de-energized, so that contact $R^{4B}$ will be closed, and relay $R^{16}$ in circuit II must be energized, so that it will close its contacts $R^{16B}$. This will insure that the pusher carriage 50 of packer unit $U^4$ is in the full retracted position before carton stop 27 can be energized. (II) Relay $R^7$ (circuit V) must be energized and relay $R^{10}$ (circuit IV) must be de-energized, so that their contacts $R^{7C}$ and $R^{10B}$ will be closed. This will insure that the pusher carriage of the second packer unit $U^5$ will be in its full retracted position before carton stop 27 can be energized. (III) The beam of electric eye $T^2$ at station B must be broken by a carton so as to keep the electric eye's relay contact $T^{2B}$ closed. (IV) Relay $R^8$ in circuit III must not be energized so its contacts $R^{8B}$ will remain closed. When all these conditions are met, relays $R^5$ and $R^6$ and solenoid valve 44 will energize and carton stop 27 will retract at station B and the carton will be carried by the conveyor Z to station C. Contacts $R^{5A}$ will close, locking in relay $R^5$. When the carton has moved out of the range of electric eye $T^2$ and its light beam has been remade, contacts $T^{2B}$ will open and contacts $T^{2C}$ will close, energizing relay $R^6$. The energizing of this relay opens $R^{6B}$ and closes $R^{6C}$ contacts, de-energizing solenoid valve 44 and locking in relay $R^6$. Now the carton stops 27 will be in operative position over the conveyor. Should another carton arrive at station B and break the light beam of electric eye $T^2$ before the preceding carton has arrived at station C, the later carton will dwell at station B. When the preceding carton reaches station C and breaks the light beam there, it will cause contacts $T^{3A}$ to open and the circuit will be reset and the sequence of the circuit will start over as soon as the carton at station C is pushed to the next station.

Circuit VIII is identical in operation to circuit VI and refers to the control wiring between stations $L^1$ and station $M^1$ and controls carton stop 35 at station $L^1$.

For carton stop 35 to operate, the beam of electric eye $T^9$ at station $M^1$ must be unbroken, thus energizing the electric eye relay and keeping contacts $T^{9C}$ closed and electric eye beam at station $L^1$ must be broken by a carton. This will keep electric eye $T^8$ relay de-energized and contacts $T^{8B}$ closed. Relay $R^{13}$ (circuit IV) must be de-energized so its contacts $R^{13C}$ will remain closed. Relay $R^{13}$ energizes when a carton is in the process of being discharged from the loading station J, of unit $U^5$, onto the discharge conveyor W. When the foregoing conditions exist, relays $R^{11}$ and the solenoid valve 44G will energize and actuate carton stop 35 and release the carton from station $L^1$. Relay contacts $R^{11A}$ will close locking in relay $R^{11}$.

When the carton leaves station $L^1$ and the beam of electric eye $T^8$ is remade, contacts $T^{8C}$ will close and relay $R^{12}$ will energize, opening contacts $R^{12B}$. This will cause the solenoid valve 44G to de-energize and the carton stop 27 will move back to operative position. Contacts $R^{12A}$ will also close, locking in relay $R^{12}$. When carton passes station $M^1$, the carton will break the beam of electric eye $T^9$, causing contacts $T^{9C}$ to open, de-energizing relays $R^{11}$ and $R^{12}$, resetting the circuit.

While certain desirable embodiments of the invention have herein been described and illustrated, it is to be understood that the invention is broadly inclusive of all equivalent arrangements and constructions such as fall within the scope of the appended claims.

I claim:

1. In a conveyor system designed to deliver articles to any of a plurality of processing stations, in combination, a continuously operating supply conveyor which receives articles from a source and which is operative to move articles, one after another, in succession along a predetermined main path, the conveyor being of the kind which permits the stopping of an individual article resting upon the conveyor without stopping the conveyor, means defining a plurality of stations spaced along said main path at any of which an article may dwell, detaining means at each of said stations operative, at times, to prevent an article from leaving said station and continuing along said path, and control means whereby the detaining means, at any given station, may be made temporarily inoperative but only when an article is at said station while the next successive station is empty.

2. In a conveyor system according to claim 1 designed to deliver articles of diverse kinds to any of a plurality of processing stations, at each of which an article of one kind is associated with an article of a different kind, and means for supplying each of said stations with articles of one kind and wherein each of the stations in the main path is a transfer station from which a branch path leads to one of said processing stations, respectively, in combination, article diverting means, which, at times, is operative to divert an article from the main conveyor path into a branch path, means in each branch path defining a dwell station, and article detaining means operative to prevent the diverting means from diverting an article into a branch path except when the dwell station in said path is empty.

3. A conveyor system according to claim 1, wherein there is a gateway station at the entrance to the main path and stop means normally operative to prevent an article from advancing from the gateway station into the main path, and control apparatus operative, at times, to render said stop means ineffective so that an article may be advanced from the gateway station into the main path, said control means being so constructed and arranged as to render the stop means ineffective only when the first station in the main path is empty and an article occupies the gateway station.

4. A conveyor system according to claim 2, having means defining a delivery path parallel to the main path and into which articles may be delivered from each of the said processing stations, respectively, stop means normally operative to prevent an article from passing from a processing station into the delivery path, means providing a dwell station in said delivery path intermediate the points at which processsed articles are delivered into said path from adjacent processing stations, stop means normally operative to prevent an article from leaving each such dwell station, and control apparatus operative to render the stop means ineffective but only when the delivery path is free of articles beyond the point, in the direction of article travel along said path, at which articles are delivered from the next adjacent processing station.

5. A conveyor system according to claim 2, wherein each branch path has a stationary smooth-surfaced floor along which articles may slide, a reciprocating pusher carriage and means for moving the carriage back and forth along said path and above the floor, movable article engaging members mounted on the carriage, and means operative to move said members into article engaging position while the pusher carriage is advancing and for moving said members from article engaging position as the carriage is retracted.

6. A conveyor system according to claim 5, wherein the article engaging members are carried by pivoted arms mounted on the carriage, and the means for moving said members comprises a motor mounted on the carriage, a fluid pressure motor for moving the carriage, a valve for determining the delivery of pressure fluid to said motor, and control means responsive to the presence of an article at the corresponding transfer station for actuating the valve.

7. A conveyor system comprising a continuously operating supply conveyor which receives articles from a source and which is operative to move articles, which are free to move, one after another in succession along a predetermined main path, the conveyor being of the kind which permits the stopping of an individual article without stopping the operation of the conveyor, an auxiliary conveyor operative to move articles along a branch path which diverges from the main path at a transfer station, and control apparatus operative automatically to determine whether an article, approaching the transfer station along the main path, shall dwell at the transfer station, continue along the main path, or be diverted into the branch path, said control apparatus comprising an article detaining device operative, at times, to prevent the advance of an article from the transfer station along the main path, and a device operative, at times, to transfer an article from the main path, at the transfer station, to the branch path, and means operative to prevent operation of any transfer device while the conveyor is moving an article along the main path through a transfer station on its way to the next transfer station.

8. A conveyor system comprising a continuously operating conveyor which receives articles from a source and which is operative to move articles, which are free to move, one after another along a predetermined main path, auxiliary conveyors each operative to move articles along a corresponding branch path, each of said branch paths diverging from the main path at corresponding transfer stations, each branch path comprising a dwell station and leading to a processing station, a delivery conveyor operative to receive articles from the several processing staitons, and control apparatus operative to determine the movements of articles along the main and branch paths, said control apparatus comprising a transfer device at each transfer station operative, at times, to transfer an article from the main path to the corresponding branch path, article detaining devices operative, at times, to prevent exit of an article from the first transfer station for delivery to the second transfer station, and sensing devices responsive, respectively, to the presence of an article at the next successive transfer station and at the dwell station of the first of said branch paths, the control apparatus being operative, in response to said sensing devices so to actuate the article detaining device at the exit to the first transfer station as to permit an article to advance along the main path to the second transfer station, providing only that the latter is empty, and the dwell station of the first of said branch paths is occupied by an article.

9. A conveyor system according to claim 8, further characterized in having a dwell station at a point in the path along which articles are advanced by the delivery conveyor, said dwell station being intermediate the operating stations of adjacent branch paths, an article detaining device operative, at times, to detain an article at said dwell station, an article sensing device at the exit to said dwell station and also at a point along said delivery path beyond the said processing station, a device operative, upon completion of the processing of an article at the first of said operating stations, to release the article into said delivery path, the control apparatus being so constructed and arranged as to render ineffective the article detaining device at the dwell station, but only when the delivery path is clear of articles between the two operating stations.

10. In a conveyor system of the kind in which a conveyor moves articles of substantially rectilinear shape along a predetermined path with the opposite sides of the article parallel to said path, the conveyor being of the kind which permits an individual article to be halted without stopping the conveyor, and which includes an article detaining element operative, at times, to detain an article at a transfer station, in combination, a transfer device at said station operative to move an article transversely and out of the conveyor path, said transfer device comprising a reciprocable carriage located above the path of articles moving along the supply conveyor path, a fluid pressure motor mounted on said carriage, said motor comprising a cylinder whose axis extends transversely of the supply conveyor path, a pair of pistons in the cylinder, a spring interposed between said pistons and which tends to move them apart, a piston rod fixed to each piston, a rack carried by each rod, a pair of levers, each pivoted at its upper end to said transversely movable part, a pinion fixed to each lever coaxially with the pivotal axis of the lever and which meshes with the corresponding one of said racks, an electrically actuated valve for determining the supply of pressure fluid to and its release from the cylinder, a sensing device responsive to the presence of an article in the transfer station and which is operative, at times, by such response, to supply current for actuating the valve, thereby to admit pressure fluid to the cylinder whereby the levers are swung toward each other into positions such that they may engage the wall of an article dwelling in the transfer station.

11. An automatically-operated conveyor system for supplying articles to each of a plurality of processing units in such a way as to minimize delay and to insure maximum production by such respective unit, said system comprising a constantly moving supply conveyor of a width to advance articles in single file only, a plurality of constantly acting serving conveyors corresponding in number to the number of processing units to be supplied, each of which is arranged to supply articles to a single one of said units, respectively, means operative to transfer articles from the supply conveyor to each of the several serving conveyors, and article detaining means associated with each serving conveyor and which is operative, at times, to hold an article in a dwell position intermediate the supply conveyor and that processing unit which is supplied by the respective serving conveyor, apparatus operative to cause the detaining means to hold an article at the dwell point when the processing unit, which is supplied by that particular serving conveyor, refuses to accept an article at the proper interval of time, while the several conveyors continue to function in normal manner, and automatically acting means operative to deny admission of an article to the receiving end of the supply conveyor except when there is at least one processing unit which is ready to receive an article.

12. A conveyor system according to claim 11 further characterized in that the means which operates to refuse admission of an article to the supply conveyor comprises a motor device operative at times to move an article pusher in a direction such as to release an article from stop means at the entrance to the supply conveyor thereby to permit said article to be advanced by the supply conveyor.

13. A conveyor system according to claim 11 further characterized in that the article detaining means associated with each respective serving conveyor comprises movable stop elements which normally extend transversely of the respective serving conveyors and are retracted from normal position by corresponding motor devices.

14. A conveyor system according to claim 11 further characterized in having means for actuating the detaining device which includes a detector sensitively responsive to the presence or absence of an article at the dwell point, said detector comprising a light source at one side of the serving conveyor and a photoelectric cell at the other side of the serving conveyor, said photoelectric cell being in series with a solenoid in an electrical circuit, said solenoid controlling a valve for admitting pressure fluid to the corresponding stop-element actuating-motor.

15. A conveyor system according to claim 11 which includes a common delivery conveyor to which processed articles are delivered by all of the several processing units, further characterized in having automatically actuated stop means operative to prevent delivery of an article to the delivery conveyor from any processing unit of the series until said delivery conveyor is clear of articles to a point beyond the next successive processing unit of the series.

References Cited in the file of this patent

UNITED STATES PATENTS

| | | |
|---|---|---|
| 2,375,863 | Mitchell | May 15, 1945 |
| 2,681,171 | Brown | June 15, 1954 |
| 2,789,678 | Hickin | Apr. 23, 1957 |